No. 635,713. Patented Oct. 24, 1899.
N. B. CONVERSE.
RAISIN SEEDING MACHINE.
(Application filed July 29, 1898.)

(No Model.) 5 Sheets—Sheet 1.

WITNESSES

INVENTOR

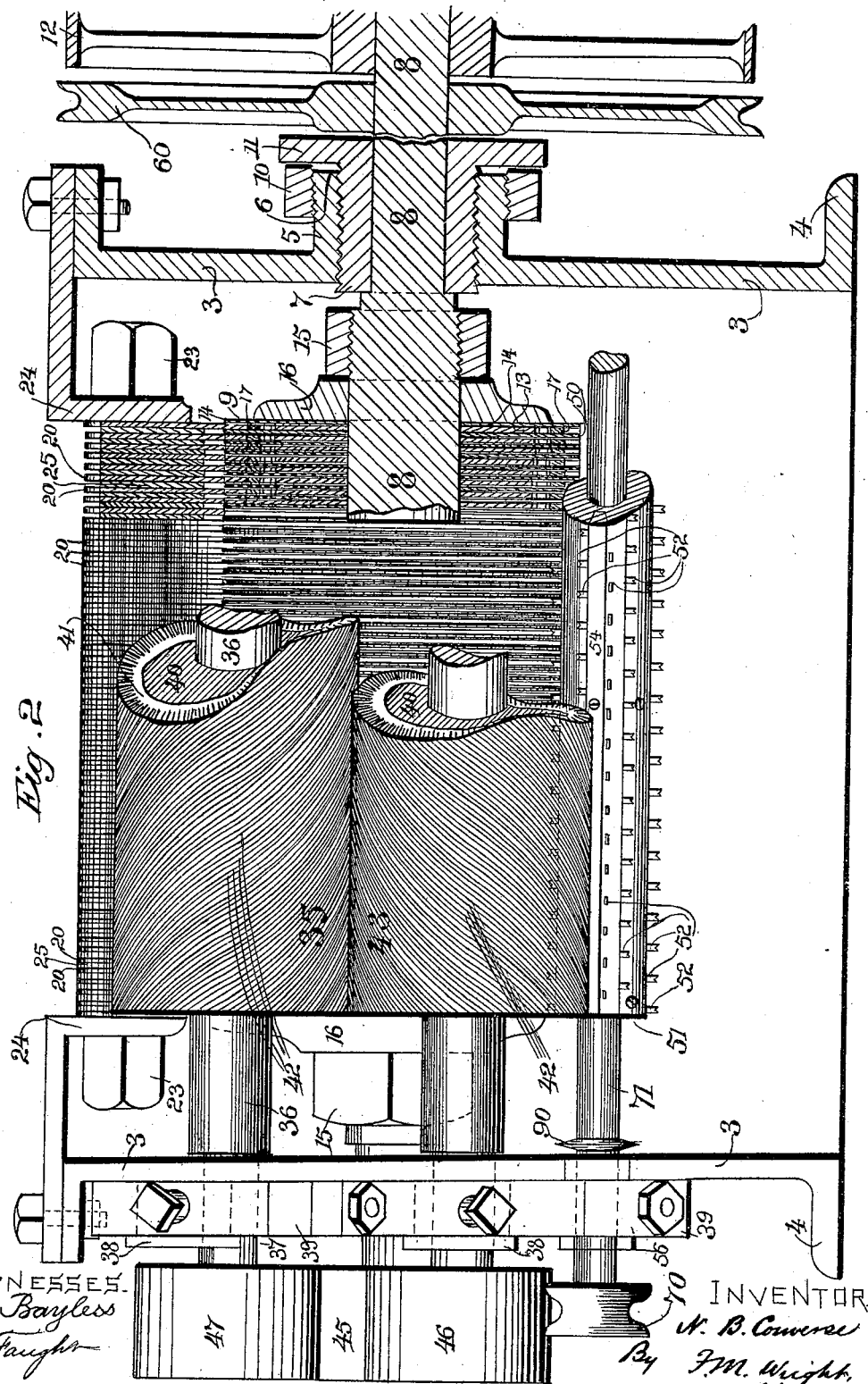

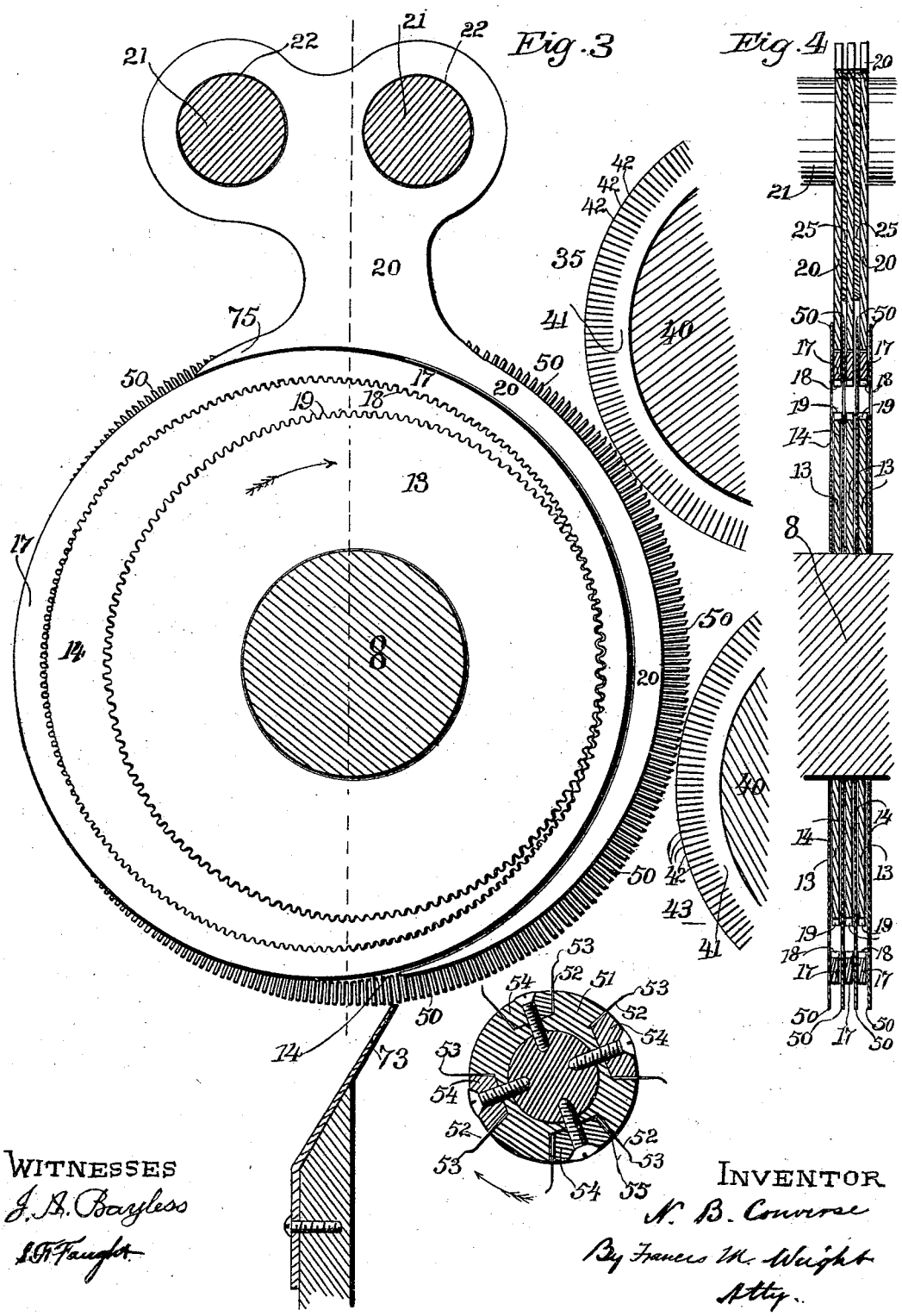

No. 635,713. Patented Oct. 24, 1899.
N. B. CONVERSE.
RAISIN SEEDING MACHINE.
(Application filed July 29, 1898.)
(No Model.) 5 Sheets—Sheet 4.
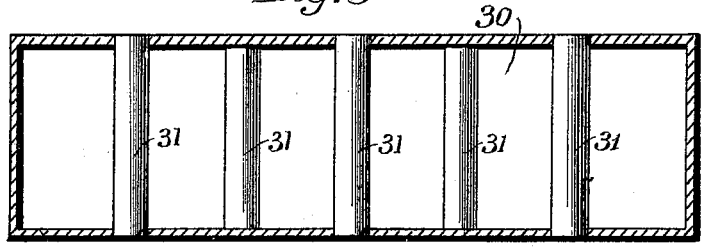
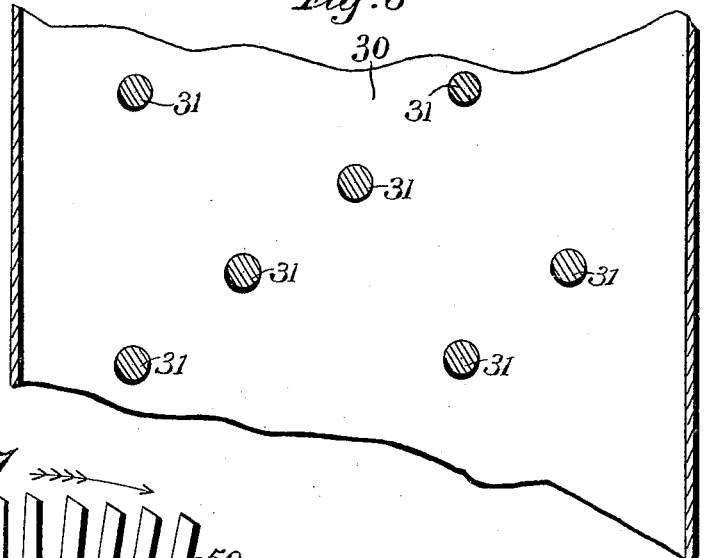
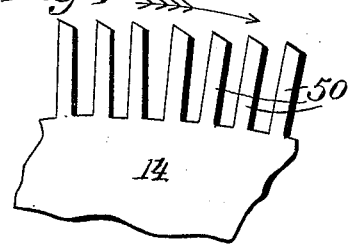
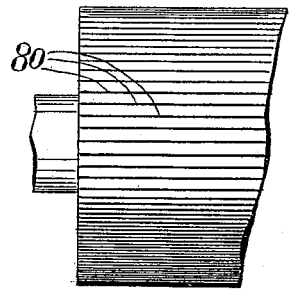
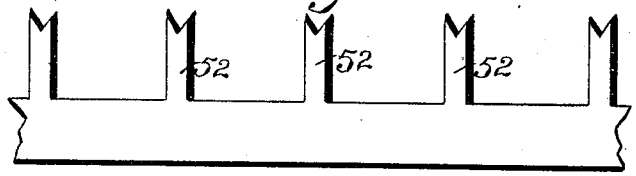
WITNESSES
J. A. Bayless
S. F. Faught
INVENTOR
N. B. Converse
By F. M. Wright
Atty.

No. 635,713. Patented Oct. 24, 1899.
N. B. CONVERSE.
RAISIN SEEDING MACHINE.
(Application filed July 29, 1898.)
(No Model.) 5 Sheets—Sheet 5.

WITNESSES.
J. A. Bayless
S. F Vaughn

INVENTOR.
N. B. Converse
By F. M. Wright
Atty.

UNITED STATES PATENT OFFICE.

NEWTON B. CONVERSE, OF FRESNO, CALIFORNIA, ASSIGNOR TO EUNICE C. CONVERSE, OF SAME PLACE.

RAISIN-SEEDING MACHINE.

SPECIFICATION forming part of Letters Patent No. 635,713, dated October 24, 1899.

Application filed July 29, 1898. Serial No. 687,235. (No model.)

*To all whom it may concern:*

Be it known that I, NEWTON B. CONVERSE, a citizen of the United States, residing at Fresno, in the county of Fresno and State of California, have invented certain new and useful Improvements in Raisin-Seeding Machines, of which the following is a specification.

My invention relates to improvements in raisin-seeding machines, the object of my invention being to provide a machine which shall remove the seeds from the raisins more thoroughly than those at present in use and without cutting or breaking the seed or leaving part of it in the raisin and also without unduly tearing or lacerating the skin of the raisin; furthermore, one in which the raisin will be removed from the machine in such a manner as to avoid as much as possible any tearing or cutting of the raisin in this operation, one in which all the parts coming in contact with the raisin will move uniformly therewith, so as to avoid rubbing the raisin, one in which the seed is finally removed from the raisin in such a manner that no part of the skin is detached therewith, and one in which the punctures or perforations of the raisin may be permitted to be finer than has hitherto been attained.

My invention further comprises improved means for thoroughly separating and spreading the raisins in delivering them to the raisin-seeder, means for regulating the supply of water to the seeding devices to obviate the stickiness which would otherwise ensue, means for readily removing the cylinder which carries the raisins for cleaning said cylinder, and means for preventing oil from the bearings being carried to the seed-remover.

Figure 1:
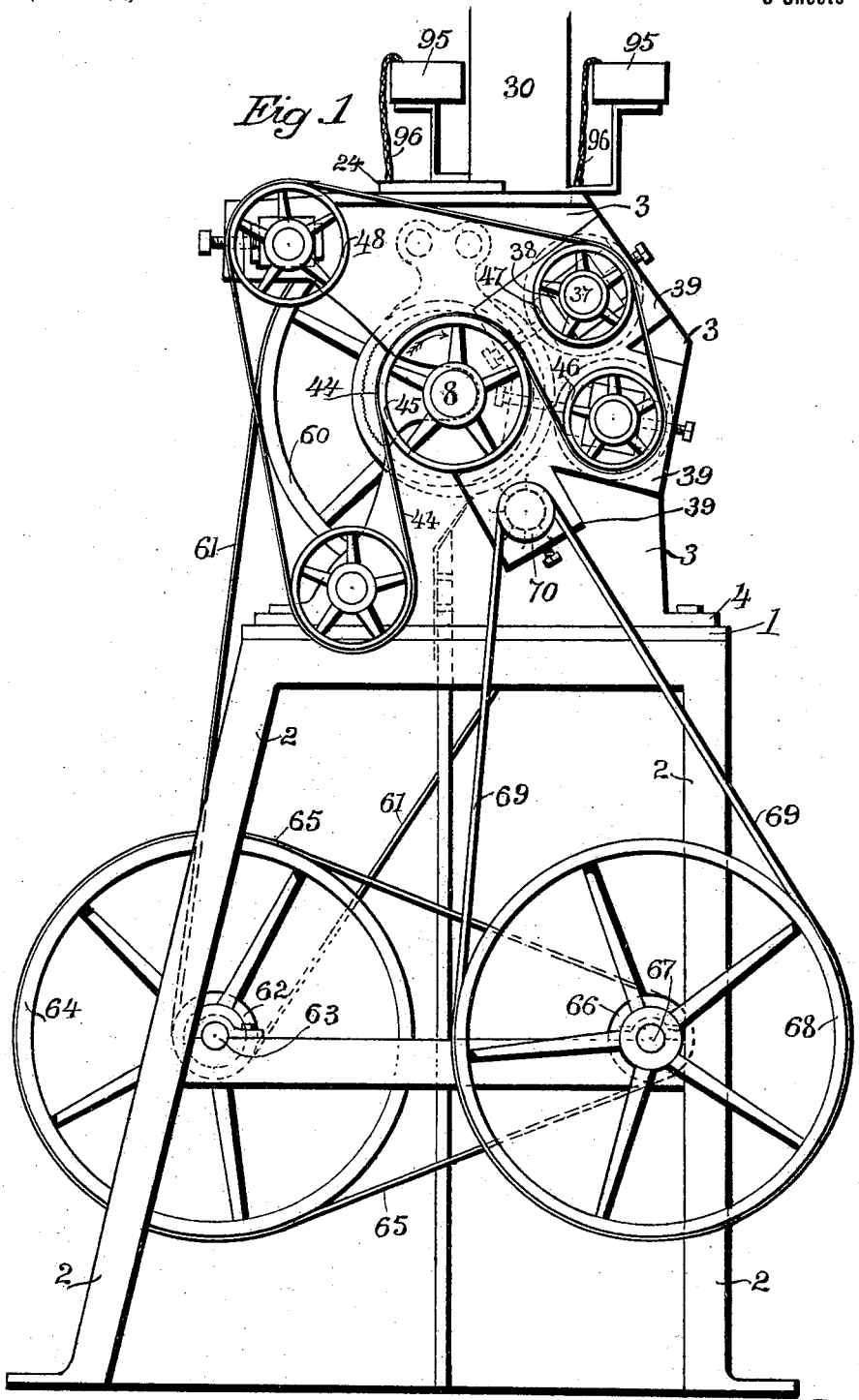
Figure 10:
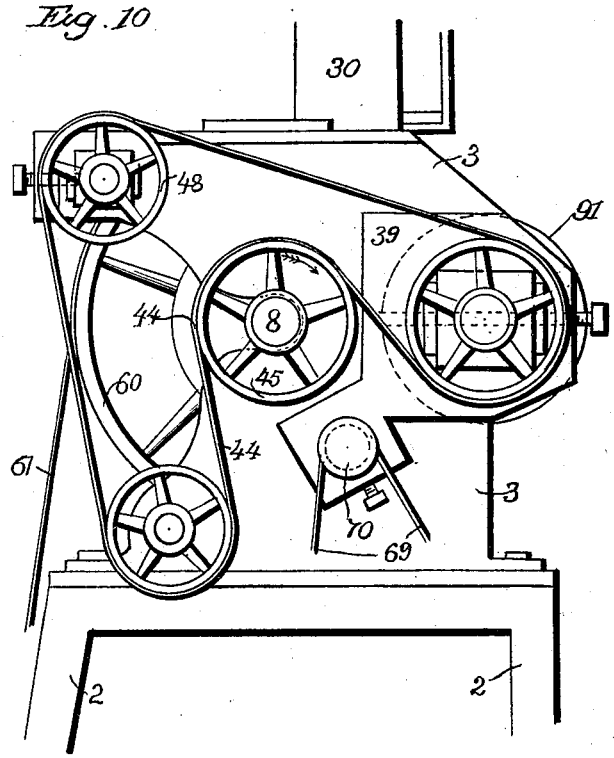
Figure 11:
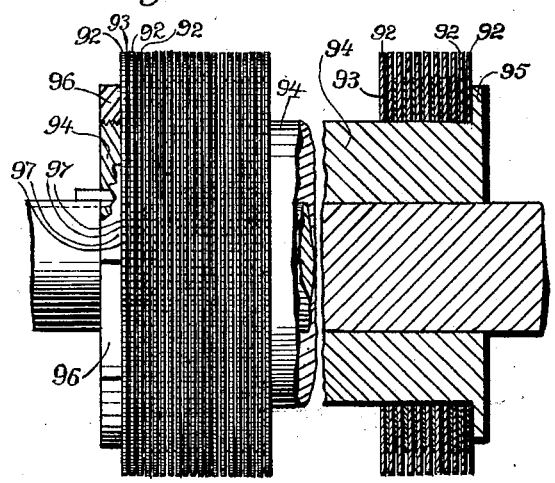

In the accompanying drawings, Figure 1 is a side elevation of the machine and its support as a whole on a scale of one-fourth the actual size. Fig. 2 is a front view of the machine proper, with parts broken away to disclose other parts beneath, on a scale of one-half. Fig. 3 is a broken transverse vertical section through the raisin-carrier, full size. Fig. 4 is a partial longitudinal vertical section. Fig. 5 is a horizontal section of the chute. Fig. 6 is a longitudinal vertical section of the same. Fig. 7 is a detail view of the teeth of the raisin-carrier. Fig. 8 is a detail view of the pickers. Fig. 9 shows a modified form of pressure-cylinder. Fig. 10 shows a modified form of the machine as a whole. Fig. 11 is a partial longitudinal section, and Fig. 12 a transverse section, of the roller thereof.

1 represents the base of the machine, supported by suitable standards 2, upon which base are erected the side plates 3, provided with flanges 4, which are bolted upon the base 1. Each of said plates 3 has in the central portion a sleeve 5, open on one side, as shown at 6, said sleeve being internally threaded to receive the bearing 7 for the shaft 8 of the raisin-carrier 9. Said sleeve 5 is threaded externally also at its terminal portion to permit the lock-nut 10 to be screwed up against an annular flange or extension 11 of the bearing 7. The shaft 8 receives its motion from the distant source of power through the medium of the pulley 12.

Upon the shaft 8 are mounted the parts comprising the raisin-carrier 9, and these consist of gear-wheels 13 and plates 14, alternated with each other and compressed tightly together by means of nuts 15, screwed on the shaft 8, and binding the plates and gear-wheels together by means of the collars 16 with sufficient pressure to cause the whole to revolve with the shaft 8. The plates 14 extend a considerable distance beyond the periphery of the gear-wheels 13, and between said plates at their outer portion are interposed the rings 17, which have internal gear-teeth 18, meshing with the external teeth 19 of the gear-wheels 13, so that the rings 17 and gear-wheels 13 revolve together. The teeth 18 are held in mesh with the teeth 19 at the front side of the machine by means of arms 20 embracing one-half the periphery of the rings 17, said arms being held rigidly in place by means of two rods 21, passing through apertures 22 in the upper portion of said arms, said rods 21 being secured by nuts 23 to brackets 24, affixed to the upper portion of the plates 3.

With the arms 20 are alternating spacing-plates 25, so that spaces are left between the extended portions of adjacent arms 20 for the passage of the plates 14 therebetween. The raisins are fed to the raisin-carrier by the chute 30, said chute being provided with rungs 31, arranged below each other out of line, as shown, to thoroughly distribute and spread the raisins. Said chute directs the raisins between the raisin-carrier 9 and the first pressure-roller 35. This pressure-roller is mounted on a shaft 36, having bearings 37 in boxes 38, each adjustable in a casting 39, bolted to the corresponding plate 3 of the machine. The roller has a wooden body 40 and a rubber surface or covering 41, and said rubber portion is slitted helically, as shown at 42, the direction of the helix being at an angle of forty-five degrees with either the longitudinal or the circumferential direction of the roller. The second pressure-roller 43 is constructed and mounted like the first, except that the slits run at right angles to the slits in the first roller. Both rollers are driven from the shaft 8 by a belt 44 on a pulley 45 on said shaft 8, said belt passing thence over a pulley 46 on the shaft of the roller 43, thence over a pulley 47 on the shaft of the roller 35, thence over idle pulleys 48, provided with the usual means for regulating the tension of the belt, and thence back to the pulley 45. It will be seen that the pressure-rollers 35 and 43 revolve in the same direction and so that the circumference thereof adjacent to the circumference of the raisin-carrier moves in the same direction as the latter, and the pulleys 46 and 47 are of such relative dimensions that said circumferences move at the same linear velocity as that of the raisin-carrier. The raisins are discharged upon teeth 50 of the raisin-carrier plates and are carried between the converging surfaces of the raisin-carrier and the first pressure-roller 35. The pressure-roller impales the raisins upon the teeth 50, but the seeds in the raisins are pressed outward on the ends of the teeth and into the slits in the pressure-roller. The rubber on each side of said slits forces back the skin of the raisin on each side of the seed and leaves the seeds exposed on the ends of the teeth 50. The second pressure-roller performs the same function on the raisin and seed, except that the slits of this roller operate at right angles to the slits of the first roller. Thus the skin of the raisin is effectively removed from four sides of the seed and the seed is left fully exposed on the ends of the teeth 50. The raisins thus impaled and the seeds thus exposed are now carried forward to the seed-remover, which comprises a cylinder 51 and pickers 52 thereon. Said pickers are arranged in two helical series on the cylinder 51 and are bent forward at their ends, as shown at 53, and also notched at their ends to more effectually hook or engage the seeds and remove them from the raisin-carrier. The pickers 52 are stamped out of spring sheet metal, the pickers in a line with each other parallel with the axis being formed on a single sheet extending the length of the cylinder and being held in place by tapering blocks 54, which are fastened by screws in corresponding longitudinal recesses 55 in the cylinder 51. Said pickers are very thin proportionately to their width, so as to yield readily in a direction circumferential of the cylinder when impinging on a seed, while being substantially unyielding in a direction longitudinal of the cylinder. The cylinder 51 is mounted on a shaft having bearings in boxes 56, adjustable in the casting 39, and is driven with great angular velocity from the shaft 8 by means of the pulley 60 on said shaft, cord 61, small pulley 62 on a shaft 63, large pulley 64 on said shaft, cord 65, small pulley 66 on a shaft 67, large pulley 68 on said shaft, cord 69, and small pulley 70 on the shaft 71 of the cylinder 51. The pickers 52 are arranged in two series and so that each picker of one series is followed at an interval of one-half a revolution by a picker of the other series, and by causing the seed-remover to revolve with great velocity, proportionately to the raisin-carrier, it is amply insured that no seed shall pass the seed-remover without being impinged upon by one of the pickers thereon and removed from the raisin-carrier. In order to insure a perfect result the ends of the teeth 50 are made beveled, as shown in detail in Fig. 7. The consequence is that when the seeds resting on said teeth are struck by the pickers the bevel of said teeth causes the seeds to draw away from the raisin without resistance by the carrying-plates as they are pushed circumferentially thereon by the pickers, so that the seeds are removed without unduly tearing the skin of the raisins. In prior forms of raisin-seeders the teeth on which the raisins are impaled have been made with pointed ends, which to a certain extent pierce the seeds so that when the seeds are pushed along the teeth by the seed-remover their effect is to cut or break the seeds and to less effectually remove the seeds from the raisins. Also, even with teeth having square ends, the seeds, being convex in form, will lie to some extent between two successive teeth, so that its surface will be caught upon the corner of the square end, and the teeth will thus offer resistance to the removal of the seeds therefrom. It has been proposed to employ teeth leaning backward for the purpose of more easily freeing the seed therefrom; but this construction has the objection that such teeth cut a slit in the raisins when the latter are impaled thereon. After passing the seed-remover the raisins are carried past the scraper or wall 73, which will further insure the removal of any seeds which might escape the operation of the seed-remover, and also serves as a wall of separation between the raisins and the seeds. After leaving the scraper 73 the removal of the raisins from the raisin-carrier commences, and this is effected by this portion of the outer rings 17 increasing the distance from the gear-wheels 13. The outer peripheries of said rings 17 push the raisins before them from off the teeth 30, and the raisins fall therefrom into any suitable receptacle or chute.

The arms 20 have extensions 75 to the rear, which serve to remove any pulp or gum from the outside of the rings 17.

The employment of the helically-slitted rubber rollers is of value, as it enables the skin of the raisin to be pushed down at the sides of the seed without unduly lacerating the same, as is the case with rubber rollers without slits. Moreover, rollers having solid rubber surfaces bear with greater pressure upon the seeds than upon the pulp around the seed. Thus the seeds are pressed firmly down upon the teeth and the teeth are caused to enter the seed, making the latter difficult to remove. I may as a modification of this improvement employ a roller having longitudinal slits 80, as shown in Fig. 9.

It will be observed that the outer surface of the rings 17 is approximately at right angles to the teeth 50. Thus when the raisins are pushed outward by the pressure of said surface the line of pressure is very nearly that of the direction of said teeth, so that no enlargement of the apertures made by the teeth takes place. This is a decided advantage over a construction in which the raisins are forced off the machine by pressure at a considerable angle with said teeth, as in the latter case the teeth tend to tear the raisins longitudinally and increase the size of the aperture.

On the shaft 71 I provide a ring or disk 90, having a sharp edge. This serves to prevent any oil traveling along the shaft 71 from the bearings of said shaft to the seed-removing cylinder. The oil is thrown off the sharp edge of the disk by the great centrifugal force at that point.

To lubricate and moisten the raisin-carrying cylinder and the pressure-roller 35, I provide water vessels 95, from which depend wicks 96 to said cylinder and roller. The supply of water may be controlled by adjusting the length of the wicks.

Figure 12:
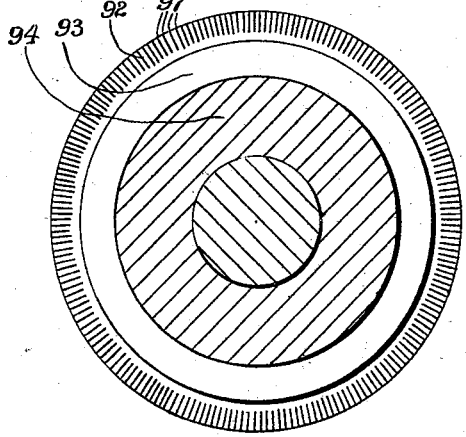

In the modification shown in Figs. 10, 11, and 12 I provide a single pressure-roller 91 instead of two successively-acting rollers. This roller comprises a number of thin rubber disks 92, alternated with very thin sheet-metal disks 93, mounted on a cylinder 94 and held firmly in place between an annular shoulder 95 on said cylinder and a nut 96, screwed on the other end thereof. Each of said rubber disks 92 is slitted transversely, as shown at 97, so that the whole periphery of the roller has a rubber surface with slits running crosswise of each other.

Having thus described my invention, what I claim, and desire to secure by Letters Patent, is—

1. In a raisin-seeding machine, a seeding-saw, provided with teeth having ends cutting the front and rear sides of the tooth at an oblique angle, the forward edge of the end being nearer the butt of the tooth than the rear edge, substantially as described.

2. In a raisin-seeding machine, a seeding-saw, provided with teeth having blunt ends cutting the front side of the tooth at an oblique angle and sloping outward from said front side, substantially as described.

3. In a raisin-seeding machine, a seeding-saw, provided with teeth substantially radially arranged and having blunt ends oblique to the general direction of the tooth, substantially as described.

4. In a raisin-seeding machine, the combination of revolving plates having teeth upon which the raisins are impaled, means for removing the seeds therefrom, inner rings alternating with said plates, outer rings alternating with the plates around the inner rings, means whereby said outer rings are caused to revolve with the plates, and means for maintaining said outer rings in orbits of revolution eccentric to those of said plates to shed the raisins, substantially as described.

5. In a raisin-seeding machine, the combination of circular revolving plates having teeth upon which the raisins are impaled, means for removing the seeds therefrom, circular rings alternating with the plates, means for revolving said rings about their centers, and means for maintaining said centers eccentric to the plates, substantially as described.

6. In a raisin-seeding machine, the combination of a revolving cylinder composed of plates having teeth upon which the raisins are impaled, means for removing the seeds therefrom, shedders interposed between adjacent teeth, and revolved therewith, and fixed guides extending partly around the shaft of the cylinder and confining the motion of the shedders to an orbit varying from that of the cylinder, to shed the raisins, substantially as described.

7. In a raisin-seeding machine, the combination of a revolving cylinder composed of plates having teeth upon which the raisins are impaled, means for removing the seeds therefrom, shedders interposed between adjacent teeth, and revolved therewith, and means for imparting a reciprocating motion to said shedders between said teeth and relatively thereto, substantially at right angles to the direction of motion of said teeth substantially as described.

8. In a raisin-seeding machine, in combination with a cylinder provided with teeth upon which the raisins are impaled, two pressure-rollers successively acting to impale the raisins thereon, and expose the seeds, said rollers having resilient surfaces helically slitted crosswise of each other, substantially as described.

9. In a raisin-seeding machine, the combination of plates having teeth upon which the raisins are impaled, gear-wheels between said plates, rings between said teeth having internal gear-teeth meshing with the teeth of the gear-wheel, and means for maintaining said rings eccentric to said plates to remove the raisins from the teeth thereof, substantially as described.

10. In a raisin-seeding machine, the combination of plates having teeth upon which the raisins are impaled, gear-wheels between said plates, rings between said teeth having internal gear-teeth meshing with the teeth of the gear-wheel and fixed arms embracing said rings and maintaining the same eccentric to said plates while revolving with said gear-wheels, substantially as described.

In witness whereof I have hereunto set my hand in the presence of two subscribing witnesses.

NEWTON B. CONVERSE.

Witnesses:
FRANCIS M. WRIGHT,
K. LOCKWOOD-NEVINS.